United States Patent
Whinnett

(10) Patent No.: US 6,192,256 B1
(45) Date of Patent: Feb. 20, 2001

(54) DEVICES FOR TRANSMITTER PATH WEIGHTS AND METHODS THEREFOR

(75) Inventor: Nicholas Whinnett, Paris (FR)

(73) Assignee: Motorola, Inc, Schaumburg, IL (US)

( * ) Notice: Under 35 U.S.C. 154(b), the term of this patent shall be extended for 0 days.

(21) Appl. No.: 09/415,168

(22) Filed: Oct. 8, 1999

Related U.S. Application Data

(63) Continuation of application No. 08/855,173, filed on May 13, 1997.

(30) Foreign Application Priority Data

May 17, 1996 (GB) .................................................. 9610357
May 17, 1996 (GB) .................................................. 9610428

(51) Int. Cl.[7] ..................................................... H04B 1/38

(52) U.S. Cl. ............................................ 455/562; 455/69

(58) Field of Search ........................... 455/562, 69, 67.3, 455/65, 63, 504, 103, 276.1, 277.1, 277.2, 88, 102, 101, 272, 24; 342/378, 380, 383, 382, 372

(56) References Cited

U.S. PATENT DOCUMENTS

| | | |
|---|---|---|
| 5,117,236 | 5/1992 | Chang et al. . |
| 5,327,143 * | 7/1994 | Goetz et al. ........................ 342/382 |
| 5,345,598 * | 9/1994 | Dent ..................................... 455/522 |
| 5,471,647 | 11/1995 | Gerlach et al. . |
| 5,539,780 * | 7/1996 | Dutkiewicz ......................... 375/340 |
| 5,590,408 * | 12/1996 | Weiland et al. ...................... 455/69 |
| 5,710,981 * | 1/1998 | Kim et al. ............................. 455/69 |
| 5,719,583 * | 2/1998 | Kanai ................................... 342/378 |
| 5,796,779 * | 8/1998 | Nussbaum et al. .................. 375/267 |

* cited by examiner

Primary Examiner—Reinhard J. Eisenzopf
Assistant Examiner—Charles N. Appiah
(74) Attorney, Agent, or Firm—Heather L. Creps

(57) ABSTRACT

A receiving communication device (101) receives a reference signal transmitted through at least one of the antennas (106, 110, 112) of an antenna array of a transmitting communication device (102). The receiving communication device determines a weight to be associated with the at least one of the antennas, and transmits weight information to the transmitting communication device. The transmitting communication device adjusts the weight associated with the at least one of the antennas according to weight information received from the receiving communication device.

4 Claims, 9 Drawing Sheets

DEVICES FOR TRANSMITTER PATH WEIGHTS AND METHODS THEREFOR

This application is a continuation of 08,855,173 filed May 13, 1997.

FILED OF THE INVENTION

The present invention pertains to antenna arrays.

BACKGROUND OF THE INVENTION

Antenna arrays have a plurality of antennas used to communicate radio frequency (RF) signals through wireless communication links. Antenna arrays provide improved performance relative to a single antenna by providing a better antenna pattern for a coverage area.

Even with an antenna array to provide an improved antenna pattern, signals communicated between communication devices are subject to interference. Buildings, bills and other objects produce multipath wave propagation, and communication devices and energy sources introduce noise, resulting in errors in the signals communicated between communication devices.

To reduce these errors, techniques have been developed to optimise the receive path of a communication device employing an antenna array. By varying the weight of the signals detected by each of the individual antennas in the array, it is possible to vary the antenna pattern to better detect signals from a particular direction or to arrange for non-destructive combination of multipath signals. These techniques adjust the weights of the antenna array signals to maximise the receive path gain by measuring the output of a receiver. However, the weights derived for the receive path does not provide optimum weights for the transmit path.

Accordingly, it is desirable to provide improved antenna array weights for a transmitter.

SUMMARY OF THE INVENTION

A communication device includes weight circuits connected between antennas of an antenna array and a transmitter. A controller is coupled to the weight circuits and controls the transmitter to transmit a reference signal through at least one of the antennas and adjusts the weight associated with the at least one of the antennas according to weight information received from another communication device whereby the transmit path can be varied according to reference signal transmitted through the at least one antenna.

Another embodiment of the invention includes a receiving communication device receiving a signal transmitted through each of a plurality of antennas in a transmitting communication device. Circuitry calculates at least one weight for the transmitter path of the other communication device from the reference signal received from each antenna. The at least one weight is communicated to the other communication device.

A method of operating the transmitting communication device is also disclosed. A method of operating the receiving communication device is also disclosed.

DESCRIPTION OF THE PREFERRED EMBODIMENT

Figure 1:
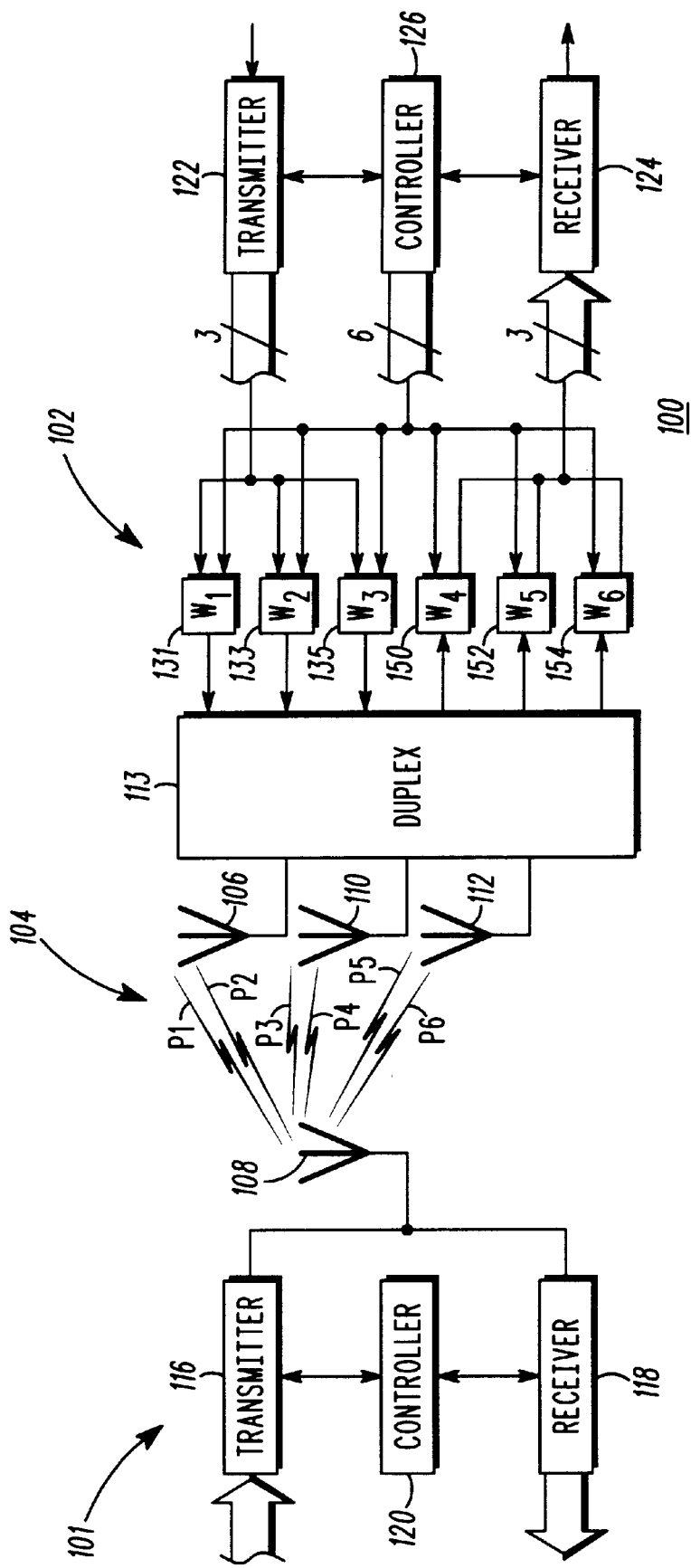
FIG. 1 is a circuit schematic in block diagram form illustrating a communication system including a communication device having an antenna array.

A communication system 100 (FIG. 1) includes a communication device 101 and a communication device 102 that communicate over communication link 104. Communication device 101 can be a wireless modem (modulator/demodulator), a cellular radiotelephone, a cordless radiotelephone, a two-way radio, a pager, a base, or any other communication device. The communication device 102 is a complementary communication device to communication device 101, and can be a wireless modem (modulator/demodulator), a cellular radiotelephone, a cordless radiotelephone, a two-way radio, a pager, a base, or any other communication device. As used herein, "communication device" refers to each of these and their equivalents.

The communication link 104 is a radio frequency wireless link which may be subject to multipath propagation. Thus, paths P1 and P2 represent two signal paths between a first antenna 106 of communication device 102 and an antenna 108 of communication device 101. Communication paths P3 and P4 extend between an antenna 110 and antenna 108. Communication paths P5 and P6 extend between an antenna 112 and antenna 108. It will be recognised that the actual number of communication paths between any one of the antennas 106, 110, and 112 and antenna 108 can be fewer or greater than two.

Communication device 101 includes a transmitter 116 and a receiver 118 connected to antenna 108. The transmitter 116 and receiver 118 are controlled by a controller 120. The transmitter 116 is implemented using any suitable commercially available transmitter for wireless communications. The receiver 118 is implemented using any suitable commercially available receiver for wireless communications. The controller 120 is implemented using a microprocessor, a digital signal processor (DSP), a programmable logic unit (PLU), or the like. The transmitter 116 and the receiver 118 are connected to antenna 108 to transmit and receive signals via the antenna.

The communication device 102 includes a transmitter 122, a receiver 124 and a controller 126. The controller 126 can be implemented using a micro-processor, a digital signal processor, a programmable logic unit, a computer or the like. The controller 126 controls the operation of transmitter 122 and receiver 124. Transmitter 122 is implemented using any suitable commercially available transmitter for wireless communications. The receiver 124 is implemented using any suitable commercially available receiver for wireless communications.

An output of the transmitter 122 is connected to transmit path weight circuits 131, 133 and 135. Each of the transmit path weight circuits is in turn connected to a respective one of antennas 106, 110 and 112 via a duplex circuit 113. The transmit path weight circuits weight the signals output by the transmitter according to a control signal received from controller 126. The signal output by the transmitter can be connected to the transmit path weight circuits 131, 133 and 135 by respective conductors, such that each receives a respective signal, or by a common conductor, such that the transmit path weight circuits all receive the same signal.

The input of the receiver 124 is connected to the output of the receive path weight circuits 150, 152 and 154. Each of the receive path weight circuits receives a respective signal from a respective one of the antennas 106, 110 and 112 input through duplex circuit 113.

The duplex circuit 113 can be implemented using any suitable duplex device, a switch circuit, a filter, or the like. The duplex circuit 113 connects the antennas to the transmit and receive paths to provide full duplex or half duplex operation.

Figure 2:
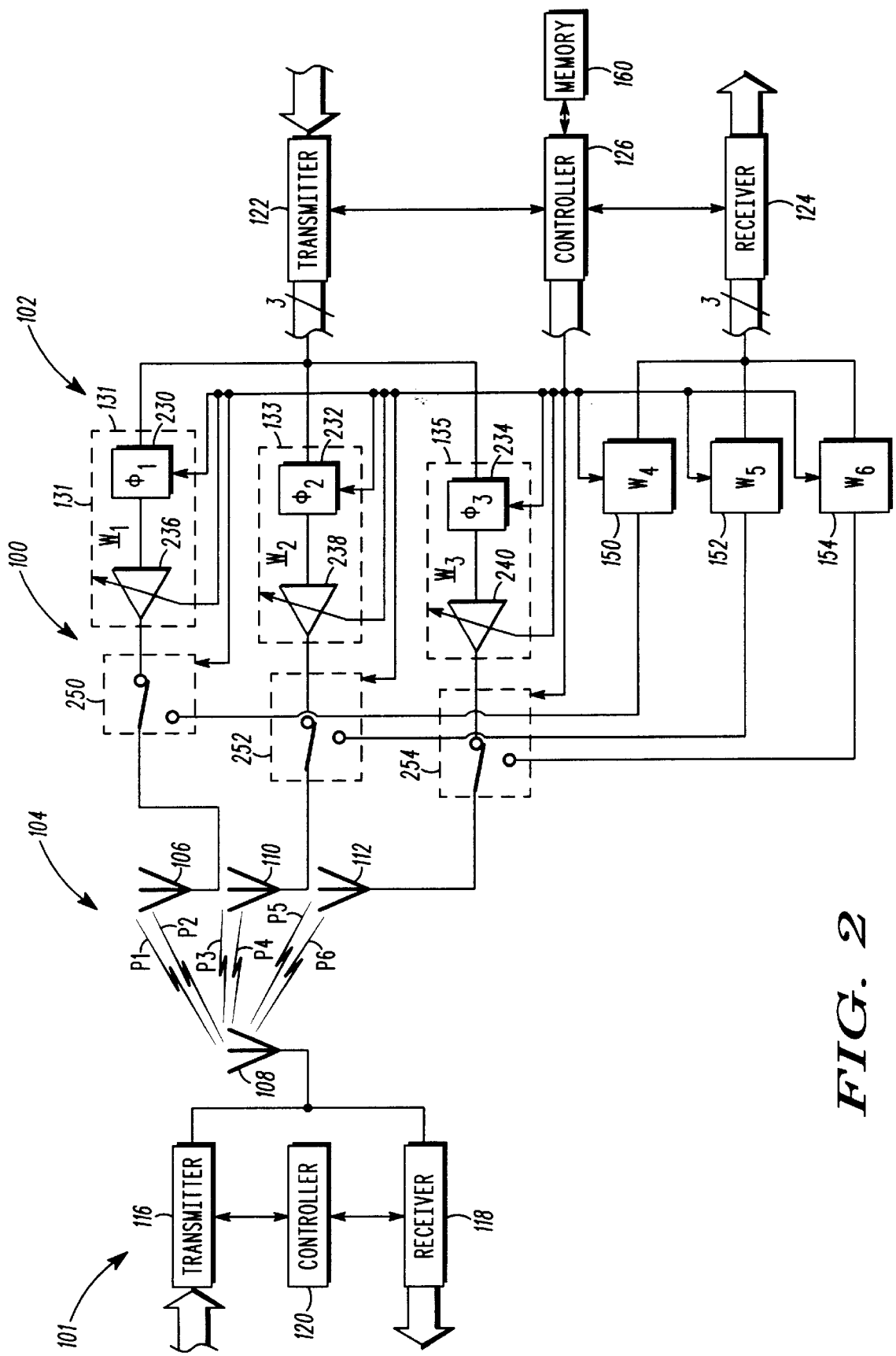
FIG. 2 is a circuit schematic in block diagram form similar to FIG. 1 but illustrating in greater detail the transmit path weight circuits for the transmission path of FIG. 1.

The transmit path weight circuits 131, 133 and 135 are shown in greater detail in FIG. 2. The transmit path weight circuit 131 includes a phase shift circuit 230 and a variable gain amplifier 236. The transmit path weight circuit 133 includes a phase shift circuit 232 and a variable gain amplifier 238. The transmit path weight circuit 135 includes a phase shift circuit 234 and a variable gain amplifier 240. A fixed gain amplifier can be substituted for the variable gain amplifier if the weights only require changes in the phase of the signal. Each of the phase shift circuits 230, 232 and 234 is independently controlled, such that the antennas have independent phase signals input thereto. Each of the amplifiers is controlled independently by controller 126. Other means of adjusting the gain and phase of the signals will be recognised by those skilled in the art. For example, the signal level can be adjusted in a digital signal processor under software control and output through a constant gain amplifier.

The variable gain amplifiers 236, 238 and 240 are each selectively connected through a respective switch 250, 252, and 254 to a respective antenna 106, 110, and 112. The switches are connected to controller 126 to receive a transmit/receive indication signal therefrom. In the transmit mode, the switches are connected as shown in FIG. 2. In the receive mode, the antennas 106, 110 and 112 are connected to the receive path weight circuits 150, 152 and 154.

The receive path weight circuits 150, 152 and 154 each receive a control signal from controller 126. Each of the receive path weight circuits is individually controlled. The output of the receive path weight circuits 150, 152 and 154 are input to receiver 124. Controller 126 adjusts weighting factors W4, W5 and W6 according to known algorithms. Generally, the controller 126 is responsive to the output of receiver 124 to adjust each of the coefficients W4, W5 and W6 to optimise the receive signal quality. The receive signal path is typically optimised by maximising the received magnitude or power or by maximising an estimate of the ratio of wanted signal to noise plus interference.

Controller 126 generates phase signals for the phase shift circuits 230, 232 and 234, and controls the gain of variable gain amplifiers 236, 238 and 240 according to predetermined values stored in a memory 160. The following tables, or "codebook" as used herein, are weights for the transmit paths including three antennas 106, 110 and 112. The gain and phase together with the equivalent complex notation are given. In these examples, $\alpha=1/\sqrt{6}$ and $\beta=1/\sqrt{3}$. With 16 vectors, the memory 160 stores the following values for the three antennas, with the index, or vector number, on the left column and the weights W1, W2 and W3 for the three transmit path weight circuits 131, 133, and 135 in the other columns:

TABLE 1

| Vector Number | $w_1$ (gain,phase) | $w_2$ (gain,phase) | $w_3$ (gain,phase) |
|---|---|---|---|
| 0 | $\alpha + j\alpha(\gamma,45°)$ | $-\alpha - j\alpha(\gamma,-135°)$ | $-\alpha - j\alpha(\gamma,-135°)$ |
| 1 | $\alpha + j\alpha(\gamma,45°)$ | $-\alpha - j\alpha(\gamma,-135°)$ | $-\alpha + j\alpha(\gamma,135°)$ |
| 2 | $\alpha + j\alpha(\gamma,45°)$ | $-\alpha - j\alpha(\gamma,-135°)$ | $\alpha - j\alpha(\gamma,-45°)$ |
| 3 | $\alpha + j\alpha(\gamma,45°)$ | $-\alpha - j\alpha(\gamma,-135°)$ | $\alpha + j\alpha(\gamma,45°)$ |
| 4 | $\alpha + j\alpha(\gamma,45°)$ | $-\alpha + j\alpha(\gamma,135°)$ | $-\alpha - j\alpha(\gamma,-135°)$ |
| 5 | $\alpha + j\alpha(\gamma,45°)$ | $-\alpha + j\alpha(\gamma,135°)$ | $-\alpha + j\alpha(\gamma,135°)$ |
| 6 | $\alpha + j\alpha(\gamma,45°)$ | $-\alpha + j\alpha(\gamma,135°)$ | $\alpha - j\alpha(\gamma,-45°)$ |
| 7 | $\alpha + j\alpha(\gamma,45°)$ | $-\alpha + j\alpha(\gamma,135°)$ | $\alpha + j\alpha(\gamma,45°)$ |
| 8 | $\alpha + j\alpha(\gamma,45°)$ | $\alpha - j\alpha(\gamma,-45°)$ | $-\alpha - j\alpha(\gamma,-135°)$ |
| 9 | $\alpha + j\alpha(\gamma,45°)$ | $\alpha - j\alpha(\gamma,-45°)$ | $-\alpha + j\alpha(\gamma,135°)$ |
| 10 | $\alpha + j\alpha(\gamma,45°)$ | $\alpha - j\alpha(\gamma,-45°)$ | $\alpha - j\alpha(\gamma,-45°)$ |
| 11 | $\alpha + j\alpha(\gamma,45°)$ | $\alpha - j\alpha(\gamma,-45°)$ | $\alpha + j\alpha(\gamma,45°)$ |
| 12 | $\alpha + j\alpha(\gamma,45°)$ | $\alpha + j\alpha(\gamma,45°)$ | $-\alpha - j\alpha(\gamma,-135°)$ |
| 13 | $\alpha + j\alpha(\gamma,45°)$ | $\alpha + j\alpha(\gamma,45°)$ | $-\alpha + j\alpha(\gamma,135°)$ |
| 14 | $\alpha + j\alpha(\gamma,45°)$ | $\alpha + j\alpha(\gamma,45°)$ | $\alpha - j\alpha(\gamma,-45°)$ |
| 15 | $\alpha + j\alpha(\gamma,45°)$ | $\alpha + j\alpha(\gamma,45°)$ | $\alpha + j\alpha(\gamma,45°)$ |

This table represents phase shifts only. This means that the phase of the transmit signal will be adjusted and the gain of the variable gain amplifiers 236, 238 and 240 will not be adjusted. For digital phase adjustment implementation, the complex baseband digital signal is multiplied by the above complex numbers. Since there are $2^4$ vectors, four bits are required to specify the index to a vector.

A larger table of values can be employed. The following Table 2 provides 31 weight combinations.

TABLE 2

| Vector Number | $w_1$ (gain,phase) | $w_2$ (gain,phase) | $w_3$ (gain,phase) |
|---|---|---|---|
| 0 | $\alpha + j\alpha(\gamma,45°)$ | $-\alpha - j\alpha(\gamma,-135°)$ | $-\alpha - j\alpha(\gamma,-135°)$ |
| 1 | $\alpha + j\alpha(\gamma,45°)$ | $-\alpha - j\alpha(\gamma,-135°)$ | $-\alpha + j\alpha(\gamma,135°)$ |
| 2 | $\alpha + j\alpha(\gamma,45°)$ | $-\alpha - j\alpha(\gamma,-135°)$ | $\alpha - j\alpha(\gamma,-45°)$ |
| 3 | $\alpha + j\alpha(\gamma,45°)$ | $-\alpha - j\alpha(\gamma,-135°)$ | $\alpha + j\alpha(\gamma,45°)$ |
| 4 | $\alpha + j\alpha(\gamma,45°)$ | $-\alpha + j\alpha(\gamma,135°)$ | $-\alpha - j\alpha(\gamma,-135°)$ |
| 5 | $\alpha + j\alpha(\gamma,45°)$ | $-\alpha + j\alpha(\gamma,135°)$ | $-\alpha + j\alpha(\gamma,135°)$ |
| 6 | $\alpha + j\alpha(\gamma,45°)$ | $-\alpha + j\alpha(\gamma,135°)$ | $\alpha - j\alpha(\gamma,-45°)$ |
| 7 | $\alpha + j\alpha(\gamma,45°)$ | $-\alpha + j\alpha(\gamma,135°)$ | $\alpha + j\alpha(\gamma,45°)$ |
| 8 | $\alpha + j\alpha(\gamma,45°)$ | $\alpha - j\alpha(\gamma,-45°)$ | $-\alpha - j\alpha(\gamma,-135°)$ |
| 9 | $\alpha + j\alpha(\gamma,45°)$ | $\alpha - j\alpha(\gamma,-45°)$ | $-\alpha + j\alpha(\gamma,135°)$ |
| 10 | $\alpha + j\alpha(\gamma,45°)$ | $\alpha - j\alpha(\gamma,-45°)$ | $\alpha - j\alpha(\gamma,-45°)$ |
| 11 | $\alpha + j\alpha(\gamma,45°)$ | $\alpha - j\alpha(\gamma,-45°)$ | $\alpha + j\alpha(\gamma,45°)$ |
| 12 | $\alpha + j\alpha(\gamma,45°)$ | $\alpha + j\alpha(\gamma,45°)$ | $-\alpha - j\alpha(\gamma,-135°)$ |
| 13 | $\alpha + j\alpha(\gamma,45°)$ | $\alpha + j\alpha(\gamma,45°)$ | $-\alpha + j\alpha(\gamma,135°)$ |
| 14 | $\alpha + j\alpha(\gamma,45°)$ | $\alpha + j\alpha(\gamma,45°)$ | $\alpha - j\alpha(\gamma,-45°)$ |
| 15 | $\alpha + j\alpha(\gamma,45°)$ | $\alpha + j\alpha(\gamma,45°)$ | $\alpha + j\alpha(\gamma,45°)$ |
| 16 | $\beta + j0(\beta,0°)$ | $\beta + j0(\beta,0°)$ | $0 + j0(0,0°)$ |
| 17 | $\beta + j0(\beta,0°)$ | $0 + j\beta(\beta,90°)$ | $0 + j0(0,0°)$ |
| 18 | $\beta + j0(\beta,0°)$ | $-\beta + j0(\beta,180°)$ | $0 + j0(0,0°)$ |

TABLE 2-continued

| Vector Number | $w_1$ (gain,phase) | $w_2$ (gain,phase) | $w_3$ (gain,phase) |
|---|---|---|---|
| 19 | $\beta + j0(\beta,0°)$ | $0 - j\beta(\beta,-90°)$ | $0 + j0(0,0°)$ |
| 20 | $\beta + j0(\beta,0°)$ | $0 + j0(0,0°)$ | $\beta + j0(\beta,0°)$ |
| 21 | $\beta + j0(\beta,0°)$ | $0 + j0(0,0°)$ | $0 + j\beta(\beta,90°)$ |
| 22 | $\beta + j0(\beta,0°)$ | $0 + j0(0,0°)$ | $-\beta + j0(\beta,180°)$ |
| 23 | $\beta + j0(\beta,0°)$ | $0 + j0(0,0°)$ | $0 - j\beta(\beta,-90°)$ |
| 24 | $0 + j0(0,0°)$ | $\beta + j0(\beta,0°)$ | $\beta + j0(\beta,0°)$ |
| 25 | $0 + j0(0,0°)$ | $\beta + j0(\beta,0°)$ | $-\beta + j0(\beta,180°)$ |
| 26 | $0 + j0(0,0°)$ | $\beta + j0(\beta,0°)$ | $0 + j\beta(\beta,90°)$ |
| 27 | $0 + j0(0,0°)$ | $\beta + j0(\beta,0°)$ | $0 - j\beta(\beta,-90°)$ |
| 28 | $1 + j0(\gamma,0°)$ | $0 + j0(0,0°)$ | $0 + j0(0,0°)$ |
| 29 | $0 + j0(0,0°)$ | $1 + j0(\gamma,0°)$ | $0 + j0(0,0°)$ |
| 30 | $0 + j0(0,0°)$ | $0 + j0(0,0°)$ | $1 + j0(\gamma,0°)$ |

In this table, $\beta=1/\sqrt{2}$, and the gains and phases are both adjusted with the transmit path to some of the antennas sometimes being completely disabled where the gain values are 0. Five bits ($2^5$ different vectors) are required to specify an index to a vector. The tables are provided by way of example, and are not exhaustive. Tables having other sizes can be defined, and different tables with the same number of entries can be used.

Each of the gain and phase values produces a different antenna pattern. By changing the gains of the variable gain amplifier, and the phases, the antenna pattern can be changed. By changing the antenna pattern, the antenna array can provide better performance to remote communication devices located in different geographic locations within the coverage area of a base, or better position a remote communication device to communicate with a base station.

Figure 3:
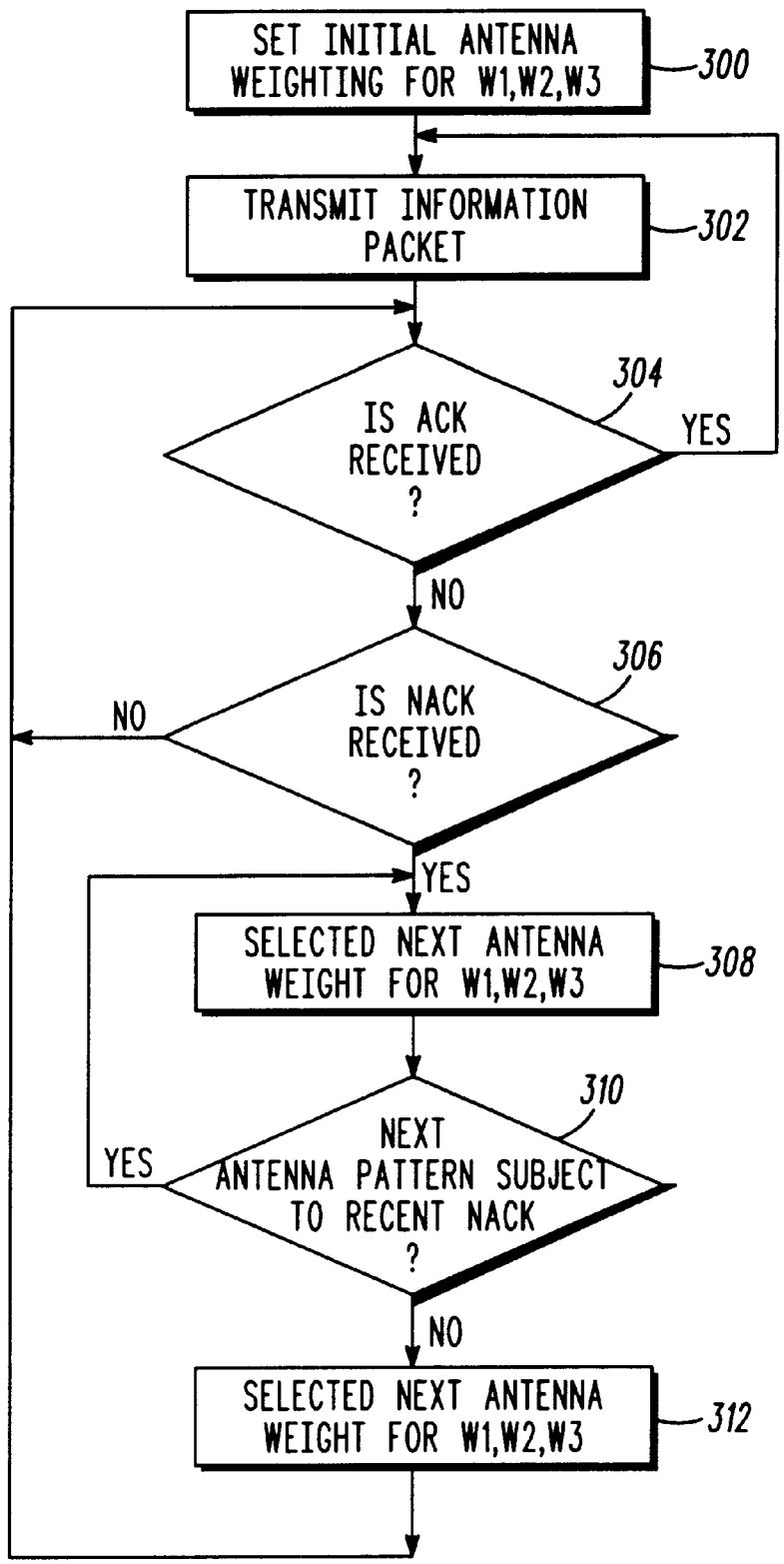
FIG. 3 is a flow chart illustrating a method of setting the transmit path gains in a communication device having an antenna array.

In operation, the controller 126 sets the weights of the transmit path W1, W2, and W3 according to predetermined values upon initially establishing a communication link with communication device 101, as indicated in block 300 (FIG. 3). For example, the initial weights can be the last weights W1, W2 and W3 from the previous connection, the initial weights can be the weights corresponding to the antenna pattern having the widest coverage area, or the weights W4, W5 and W6 calculated for the receive path can be used as the initial weights W1, W2, and W3 for the transmit path. The antenna weights can set the gains of variable gain amplifiers 236, 238, and 240 and the phases of phase shift circuits 230, 232 and 234, or only the phases of the phase shift circuits can be set.

During communication, information packets are transmitted by transmitter 122 to communication device 101, as indicated in block 302. The other communication device 101 receives the signals transmitted from transmitter 122 and transmits back an acknowledgement signal (ACK) or a non-acknowledgement signal (NACK), depending upon whether the signal was received accurately, as is known in the art. Typically a checksum or cyclical redundancy check (CRC) data is transmitted with each information packet. If the CRC or checksum is not produced from the information packet actually received, the NACK signal is transmitted to receiver 124.

If the controller 126 receives an acknowledgement signal, as detected in block 304, the next information packet is transmitted. If an error signal, such as a NACK, is received from communication device 101, as detected at block 306, the controller 126 selects new antenna weights W1, W2, and W3, in block 308. This changes weights W1–W3 such that the antenna pattern is altered. The new weights can be the weights associated with the next Vector Number in the codebook stored in memory 160, as represented in Tables 1 or 2.

The controller 126 determines whether the next antenna pattern is one that was recently subject to an error signal from the other communication device 101 (e.g., a NACK was received from the other communication device when the new antenna weights was last employed), in decision block 310. A predetermined time period can be set in the controller 126. The controller 126 will not permit weights to be selected if it was subject to an error signal within this predetermined time period. This prevents the controller 126 from rapidly cycling through patterns when the connection quality is such that none of the weights provides an error free connection.

If an error message was received, the controller 126 controls transmitter 122 to retransmit the information, in decision block 312. The controller 126 then returns to the block 304 to await an acknowledgement signal or an error signal from the other communication device.

It will be recognised that the decision blocks 304 and 306 could be executed by an interrupt initiated by an error signal that occurs during ordinary transmission processes. Thus, buffering of packets, with coding and interleaving between them, as well as modulation and transmission, can be an ongoing process of the communication device 102. Upon detection of an error signal, such as a NACK, the controller 126 interrupts the transmission briefly to change the weights W1, W2 and W3. The transmission process will then resume.

It will also be recognised that the weights W4, W5 and W6 will be adjusted by controller 126 based upon the signals output by receiver 124. Such methods of weighting are well known in the art.

The present invention is particularly advantageous in communication systems where the transmit and receive paths have different frequencies, such as the GSM communication system. In such environments, the weights of the receive path by receive path weight circuits 150, 152 and 154, is not necessarily indicative of the optimum weights for the transmit path by transmit path weight circuits 131, 133 and 135. This is due to propagation delays, interference, and other frequency sensitive phenomena.

Another important consideration is the rate at which the communication devices 101 and 102 are moving relative to one another. If a communication device 101 is travelling rapidly, and the communication device 102 is stationary, the propagation paths P1–P6 will change quickly. At other times, communication devices 101 and 102 may not be moving relative to one another. This is true in pedestrian situations, which is where a cellular phone user is standing still or walking during a phone call. The paths P1–P6 will change at a slow rate, or not at all, in such pedestrian situations.

One or both of the communication devices 101 and 102 can advantageously determine the rate at which communication devices 101 and 102 are moving relative to one another. For example, Doppler measurements can be used to determine the rate of change. The controller 126 uses the rate of change information to determine whether to change the phase and amplitude settings. More particularly, the present invention is particularly advantageous where the communication devices 101 and 102 are slowly moving or are not moving relative to one another because in these situations the delay in receiving a NACK will cause least detriment to the performance. In these situations, selection of the antenna pattern can have a substantial impact on the performance of the telephone during the call. This is due to the fact that the antenna pattern that will best service the user will not change. Additionally, a bad antenna pattern will likely remain undesirable throughout the call.

In the situation where the communication device 101 is in a vehicle travelling at a high velocity, the weights creating an antenna pattern that best services the communication device 101 may change rapidly. Accordingly, altering the antenna pattern each time an error signal is received may not result in a substantial improvement in the performance of the communication system 100. Additionally, weights that do not work well one instant may be the best choice seconds later, which could result in rapid switching of weights W1, W2, and W3. The influence of velocity of course depends on the design of the system, in particular the delay between transmission of a packet and receiving a NACK.

The memory 160 storing the gain and phase values can store a table of most recently used antenna patterns. Those patterns which resulted in an error indication are preferably not used for a predetermined time period. The predetermined time period is preferably adjustable according to the rate at which the communication devices 101 and 102 are moving relative to one another. Thus, where communication devices 101 and 102 are not moving apart, the time period can be equal to the entire connection time of communication devices 101 and 102. Alternatively, where communication devices 101 and 102 are moving rapidly relative to one another, the time period can be very short, or zero. In any case, the predetermined time period should be greater than the correlation time of the channel to prevent reselection of a weight vector which previously resulted in an error and which could still provide poor performance if the channel has not changed much.

An advantage of the above embodiment is that the communication device 101 changes the weights without the assistance of other communication devices. Accordingly, the weight adjusting circuit can be implemented in existing systems without having to update existing equipment.

Figure 4:
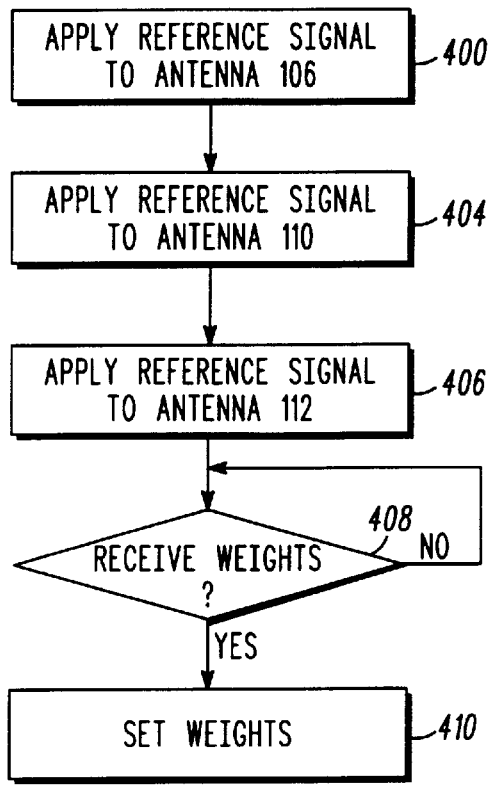
FIG. 4 is a flow chart illustrating a method of setting the transmit path gains in a communication device having an antenna array.

According to anther embodiment, a signal is transmitted by communication device 102 to determine the weights for transmit path weight circuits 131, 133 and 135 where the determining takes place at a communication device 101. This embodiment will now be described with reference to FIGS. 4 and 5. The controller 126 controls the transmitter 122 to generate a reference signal applied to antenna 106, as indicated in block 400. The reference signal can be a tone or any other suitable signal.

The reference signal is applied to antenna 106 by controlling the gain of variable gain amplifiers 238 and 240 to have a gain of zero and controlling variable gain amplifier 236 to have a non zero gain. The controller 126 controls transmitter 122 to output a tone signal to antenna 110, as indicated in block 402. To supply the tone only to antenna 110, only the gain of variable gain amplifier 238 has a non zero value. The controller 126 controls transmitter 122 to output a tone signal to antenna 112, as indicated in block 404. To supply the tone only to antenna 112, only the gain of variable gain amplifier 240 has a non zero value.

Thus a predetermined tone is input to each of the antennas at different times. Alternately, a different frequency signal can be simultaneously input to each antenna 106, 110, and 112, or signals having different codes can be simultaneously input to each antenna. However, by any of these three means, the signal applied to each antenna must be distinguishable by communication device 101.

It will be recognised that the transmitter 122 can be connected to transmit path weight circuits 131, 133 and 135 through respective conductors of a bus extending from transmitter 122 to transmit path weight circuit 131, 133 and 135. This permits different signals generated by the transmitter 122 for each of the antennas to be individually applied to the transmit path weight circuits.

Controller 126 waits to receive weight signals at receiver 124, as indicated in decision block 408. The controller 126 can alternately be interrupted from standard transmission operation when the weight signals are received. In either case, when new weights are received from communication device 101, the controller 126 changes the weights of the transmit path weight circuits 131, 133 and 135 to the values received from communication device 101, as indicated in block 410. If the index is received from communication device 101, then the controller 126 selects the weights associated with the index from the codebook in memory 160 and controls the transmit path weight circuits 131, 133, and 135 accordingly.

Figure 5:
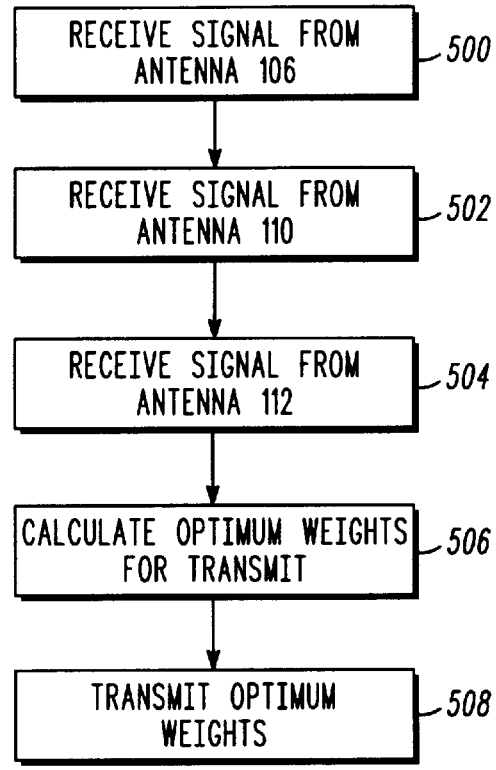
FIG. 5 is a flow chart illustrating a method of operating a communication device in communication with a communication device operating according to FIG. 4.

The operation of the communication device 101 will now be described with reference to FIG. 5. The controller 120 receives the reference signals transmitted via each of antennas 106, 110 and 112 in blocks 500, 502 and 504. Although the signals associated with the respective antennas 106, 110 and 112 are separated in time, as described above with reference to FIG. 4, they could alternately be identified by their frequency if they have different frequencies, or by their code if they have different codes. The controller 120 thus identifies the reference signal transmitted by each antenna.

The controller 120 calculates the optimum weights for the transmit path weight circuits 131, 133, and 135 based upon the received signal levels for each of the antennas 108, 110 and 112, as indicated in block 506. The optimum weight vector can be calculated from the received signal gain and phase. The complex conjugate of the complex representation of the estimated gain and phase from each antenna can be used as the weight for each antenna. The estimated gain and phase for each antenna is obtained in the controller 120 by correlation of the reference signal received with a local copy of the predetermined reference signal stored in controller 120. The result of the correlation between these signal indicates the estimated gain and phase of the transmission path from each of antennas 106, 110 and 112.

Alternately, the codebook can be used to choose a preferred weight vector from the candidate list. This can be done by selecting the vector from the codebook that is closest to the optimum weight vector as calculated from the complex conjugate of the estimated received phase and gain. Alternatively, the preferred weight vector is chosen to maximise the received signal power at the receiving communication device.

The weights from the codebook maximising the power can be calculated. As already mentioned, the gain and phase of the reference signal sent from each antenna is estimated in the receiver by correlation with a known local copy of the reference signal originally transmitted. The weight vector is then selected as follows:

$t = |w_0^T c|$ index=0 do k=1 to K−1 if $|w_k^T c| > t$ then
index=k
$t = |w_k^T c|$
end if end do where the estimated gain and phase of the signal received from the i'th antenna (antenna 1, antenna 2 and antenna 3)

is represented in complex notation by $c_i$ and the set for all antennas by the vector c; and the k'th weight vector in the predetermined list is $w_k$ where there are K vectors in the list stored in memory 160 of communication device 102 and in controller 120 of communication device 101. |*| represents the magnitude of the complex number *. Also *$^T$ represents the transpose of vector or matrix * where the rows and columns are interchanged.

This method multiplies the weights $w_k$ of each vector in the index codebook and the weight and gain estimate for each antenna $c_i$, and adds the result to generate a temporary amplitude measurement t for the particular weights. This is an estimate of the amplitude of the signal which would be received if the particular weights were applied at the transmitter. The index associated with the largest t (the highest estimated amplitude at the receiver) is selected as the optimum weight for the transmit path of communication device 102. The index associated with the optimum weights are then sent back to communication device 102, as indicated in block 508.

Simulations show that the codebook approach requires less capacity overhead on the downlink than a quantisation approach of the complex conjugated received gain and phase when appropriate normalisation and candidate vector distributions are used. In addition, the codebook entries can be selected to provides the following benefits. By selecting weights such that signals are emitted through more than one of the antennas, a single antenna transmit path is not required to pass all of the power. This provides a restriction on individual amplifier peak power requirements for the transmit circuitry in each path providing both a cost and size benefit relative to a system where it is possible that one of the transmit paths may have to pass all the power.

Additionally, the lookup table, or codebook, can be used to facilitate error protection coding, such a checksums or CRC information. The error protection coding can be saved with the index information, and transmitted without requiring calculation of the error protection coding. This reduces the complexity of the transmitter error protection encoding.

Another advantage of the lookup table is that candidate weight vectors evaluated at each frame time can be those closest to the weight vector for the most recent frame. This reduces the search complexity for pedestrian environments where slow speeds cause the optimum weight vector to change slowly, as the previous weights are likely to remain a good choice. However, the controller can also consider all the weights in the codebook if the weights closest to the weights of the previous selection are unsatisfactory.

Where the codebook is used, the communication devices 101 and 102 must have the same values. This can be accomplished by downloading the codebook from one of the communication devices to the other communication device. Alternately, another method could be provided to verify that the vector number values are the same in both communication devices.

Figure 6:
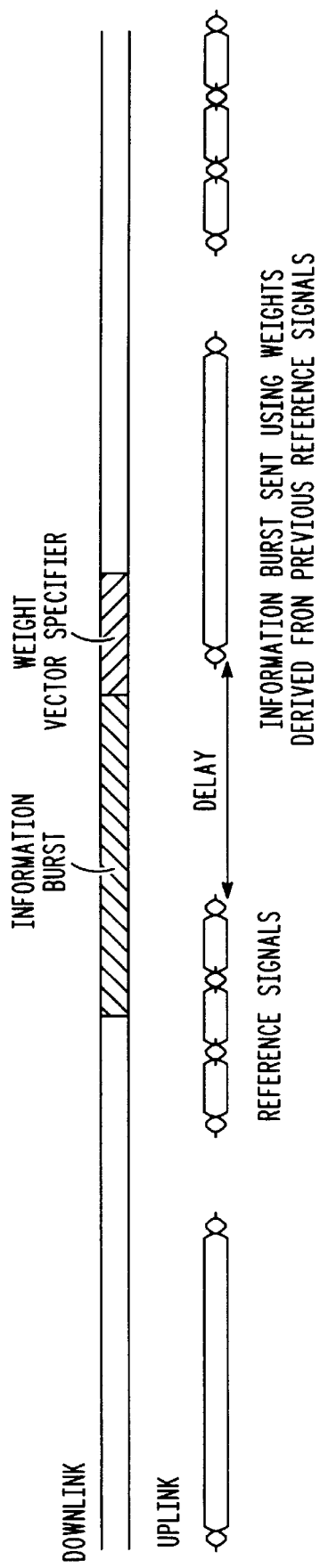
FIG. 6 is a signal diagram for signals transmitted between communication devices.

With reference to FIG. 6, it can be seen that both an information packet and the reference signals are transmitted from communication device 102 to communication device 101. The reference signals are sent separately from each antenna, one after the other. There is a delay from the time that the information is processed in communication device 101 to calculate the coefficients and the time that the weight vector specified in communication device 101 is used by communication device 102. The communication device 102 then transmits an information packet using the weights received from the communication device 101.

Each time an information packet is transmitted, the reference signals are communicated from the antennas 106, 110 and 112, and new weights calculated for the next packet in communication device 101. In order to minimise effects of delay in the feedback system, the reference signals can be positioned non contiguous with the information packets such that the reference signals are closer to the information packet sent by communication device 102 using the coefficients. Alternatively, the reference signals can be positioned in the information packet. Using either method to minimise or eliminate the delay helps avoid problematic communications resulting from changes in the channel occurring after the reference signals are communicated.

It is also envisioned that the controller 120 can interpolate weights for the antenna from the weights generated from reference signals transmitted with two packets of information. By generating the coefficients from two consecutive, spaced reference signals, changes in the characteristics of the transmission paths can be taken into account in determining the best signal pattern.

Figure 7:
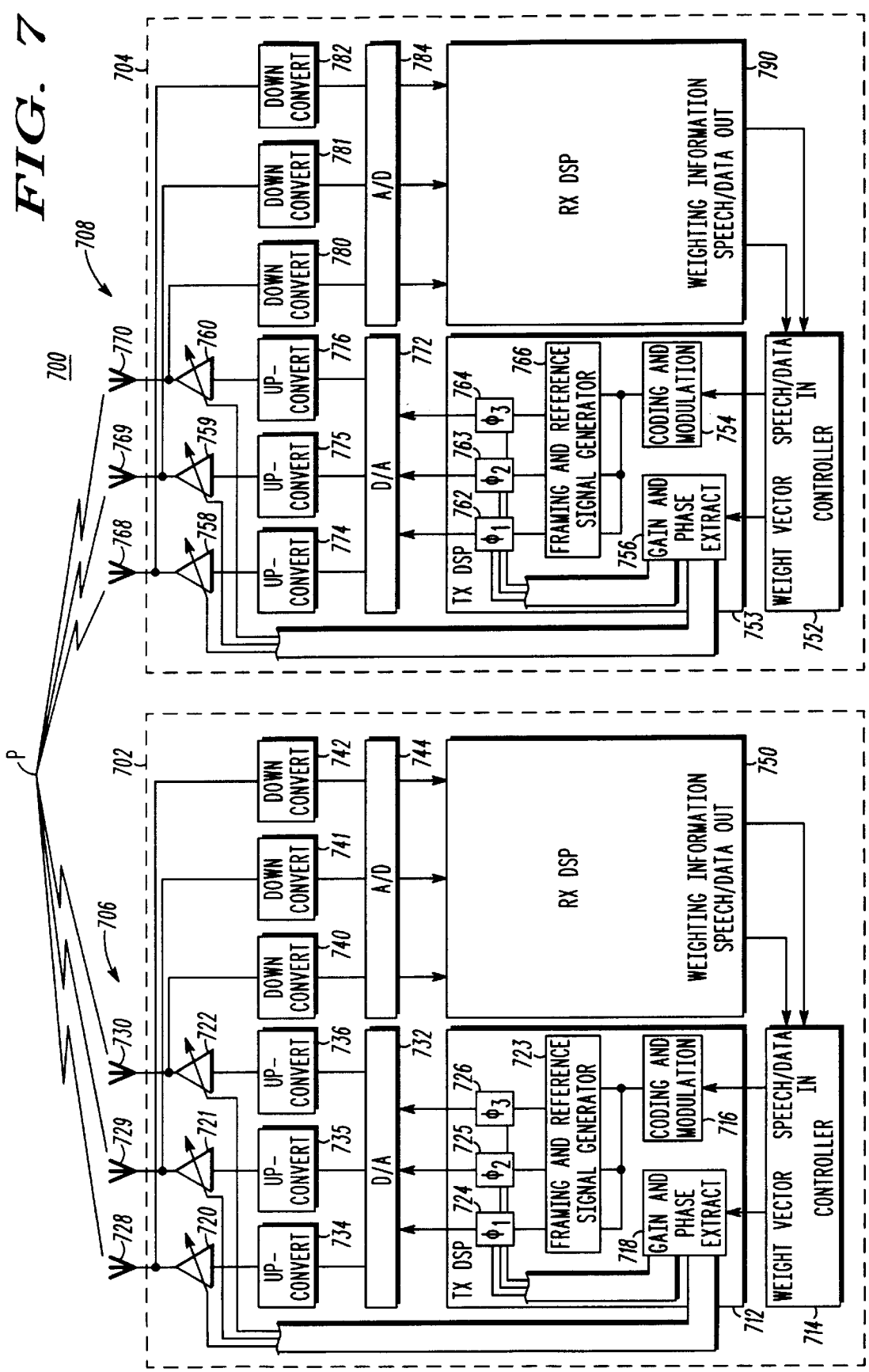
FIG. 7 is a circuit schematic in block diagram form illustrating a communication system including two communication devices having antenna arrays.

A transmit mode of a digital cellular telephone system 700 (FIG. 7) includes a first communication device 702 and a second communication device 704. Communication device 702 includes an antenna array 706 and communication device 704 includes an antenna array 708. The antenna arrays are interconnected by a plurality of signal paths represented by P. The communication devices 702 and 704 can be two-way radios, a radiotelephone and a base, or the like.

The communication device 702 includes a controller 714 which outputs speech and data signals as well as control signals to select the weights W1, W2 and W3 in the transmit path. The speech and data signals are input to a coding and modulation circuit 716. The weight control signals are input to a gain and phase shift circuit 718, which couples the amplitude and phase control signals from controller 714 to variable gain amplifiers 720–722 and phase shift circuits 724–726. The transmission signals are input to phase shift circuits 724–726 via a framing and reference generating circuit 723.

The framing and reference generating circuit 723 frames data and speech for transmission and couples reference signals to the phase shift circuits 724–726, one for each of antennas 728–730. Respective base band signals are formed by framing and reference generating circuit 723, one for each antenna, and the appropriate phase shift is applied to each by phase shift circuit 724–726.

The phase shift circuits 724–726 are provided digitally by a multiplier, such that the complex values from the codebook can be multiplied by the output of the framing and reference generating circuit to produce the phase shift. The phase shifted signals are converted to analogue signals in a digital-to-analogue converter circuit 732. The frequency of the analogue signals is increased in an up converter 734–736, and the higher frequency signals are amplified in the variable gain amplifiers 720–722. The gain of the variable gain amplifiers 720–722 is selected according to the weights for each antenna. Thus, the transmit path weight circuit in the transmit path comprises phase shift circuits 724–726 and variable gain amplifiers 720–722. Although 3 phase shift circuits are shown in this example, in practice it would only be necessary to implement two since the absolute phase does not matter, only the relative phases of the three transmit path weight circuits.

The receive path of communication device 702 includes down converters 740–742 for reducing the frequency of the signals received from antennas 728–730, respectively. The down converted signals are input to an analogue-to-digital converter circuit 744, which outputs respective digital signals from each of the signals output by the down converters. The digital signals are demodulated in a receiver processor 750.

The communication device 704 includes a controller 752 which outputs speech and data signals as well as control signals to select the weights W1, W2 and W3 in the transmit path The speech and data signals are input to a coding and modulation circuit 754. The weight control signals are input to a gain and phase shift circuit 756, which couples the amplitude and phase control signals from controller 752 to variable gain amplifiers 758–760 and phase shift circuits 762–764. The transmission signals are input to phase shift circuits 762–764 via a framing and reference generating circuit 766. The framing and reference generating circuit 766 frames data and speech for transmission and couples reference signals to the phase shift circuits 762–764, one for each of antennas 768–770. Respective base band signals are formed, one for each antenna, and the appropriate phase shift is applied to each by phase shift circuits 762–764. The phase shifted signals are converted to analogue in a digital-to-analogue converter circuit 772. The frequency of the analogue signals is increased in up converters 774–776 and higher frequency signals are amplified in the variable gain amplifiers 758–760. The gain of the variable gain amplifiers is selected according to the weights for each antenna.

The receive path of communication device 704 includes down converters 780–782 for the signal from antennas 768–770, respectively. The down converted signals are input to an analogue-to-digital converter circuit 784, which outputs respective digital signals from each of the signals output by the down converters. The digital signals are demodulated in a receiver processor 790.

The communication devices 702 and 704 are illustrated as being identical as the transmit path can be from communication device 702 to communication device 704 or from communication device 704 to communication device 702. However, the communication devices 702 and 704 can be different, such that communication device 702 is a base station and communication device 704 a radiotelephone, for example. It will be recognised that in the case of a base, the transmit path will also include a multiplexer to combine signals for multiple simultaneous users. The receive path of a base will also include a demultiplexer, to separate the signals from different simultaneous users.

Calculation of the optimum weights for the transmit path will now be described for transmission from communication device 702 to communication device 704, although the description applies equally for communications from communication device 704 to communication device 702. Although the communication devices 702 and 704 have three antennas, the description applies equally to systems having other numbers of antennas, and thus applies generally to a system having I antennas in the transmit path of the transmitting communication device and N antennas in the receive path of the receiving communication device. For communications from communication device 702 to communication device 704, I equals 3 and N equals 3.

The estimated gain and phase of the signal received at the n'th receiver antenna from the i'th transmitter antenna is represented (in complex notation) by $c_{i,n}$ and the set for all combinations by the matrix C (with N rows and I columns). The estimated gain and phase at the antennas 768–780 which would be produced by a transmitter weight vector w is then given by Cw. The weight vector is selected from the codebook as follows:

$V=Cw_0$
$t=v^H v$
index=0 do k=1 to K−1
$v=Cw_k$
$p=v^H v$ if p>t then
index=k
t=p
end if end do

The controller 752 of communication device 704 uses this method to calculate the vectors v by multiplying the matrix C by a weight vector $w_0$, which is the first weight vector in the codebook. An initial value t is calculated from the vector v derived from $w_0$. This value of t represents an estimate of the amplitude of the signal which would be obtained at the receiver with weight vector $w_0$ at the transmitter and maximum ratio combining of the signals at the receiver. Maximum ratio combining is a well known technique of combining signals from multiple antennas. Vectors v are derived from C and each vector $w_k$ of weights. The estimated magnitude p for each weight from the codebook is calculated by multiplying v and the Hermitian transform of v for that weight vector. The index k associated with the highest value p so measured in controller 752 is sent back to the transmitting communication device 702. The controller 714 controls the variable gain amplifiers 720–722 and phase shift circuits 724–726 to have the weights corresponding to the index number transmitted.

The controller 752 thus estimates the performance at the output of receiver processor 790. The output of the receiver processor 790 is derived from the combined output of antennas 768–770 of antenna array 708. This estimate is also based upon weights of the receive path determined by the controller 752.

As mentioned, a maximum ratio combiner is employed for the receiver. Other optimisation techniques such as optimum combining could be substituted particularly when it is desirable to reduce the effects of interference. Optimum combining is a known technique. Instead of maximising received amplitude or power, the controller 752 ratio could maximise the ratio of wanted signal to interference plus noise.

Embodiments will now be described wherein the receiving communication device includes an equaliser 820. In these embodiments, the description is for a receiving communication device including a single antenna and a transmitting communication device having multiple antennas, as illustrated in FIGS. 1 and 2.

In these embodiments, a reference signal is employed to determine the weights and to calculate settings for an equaliser 820 in the receive path. It is known to transmit a reference signal to a receiving communication device to be used by the receiving communication device in setting an equaliser 820. In existing systems, the reference signal is selected to simplify the setting of the coefficients.

However, the inventors have discovered that where the transmitting device includes an antenna array and the receiving device includes an equaliser, the reference signal transmitted can be selected to reduce transmission overhead for reference signals while maintaining large gains with an antenna array.

The present invention requires transmission of multiple reference signals, one for each antenna in the array. Where communication device 101 is a base and communication device 102 is a radiotelephone, it is advantageous to use a signal which minimises transmitting overhead for selecting the weights in the transmit path of communication device 102 without concern for the resource requirements in the communication device 101 that is a base. The communication device 101 that is a base will have sufficient capability to execute difficult computations in selecting the equaliser 820 values, whereas it is advantageous to minimise the energy requirements in the communication device 102 to prolong battery life.

If on the other hand the communication device 101 is mobile and the communication device 102 is a base, it is desirable to minimise the requirements of communication device 101. The transmission requirements are not as critical to the base as it can broadcast a signal without concern for battery life. The greater concern is the drain on the resources of the portable communication device while calculating values for the equaliser 820 in its receive path. Accordingly, if the communication device 101 is a portable communication device, it is desirable that the reference signal simplify calculation of the equaliser settings. Therefor, it is envisioned that different signals can be employed for the reference signal depending upon which of the communication devices 101 or 102 is portable in communication systems such as a radiotelephone networks.

Figure 12:
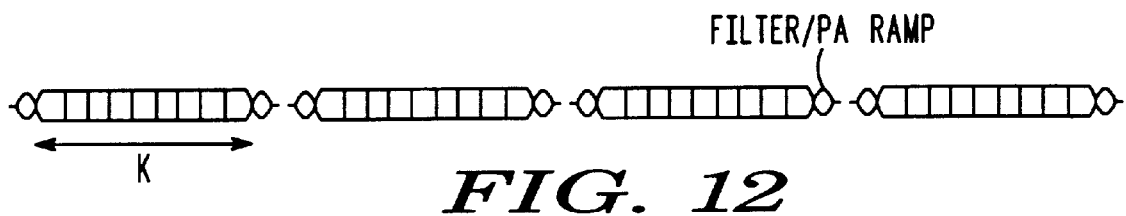
FIG. 12 is a signal diagram illustrating the reference signal when an equaliser is used in the receive path.

If the communication device 101 is a radiotelephone, the reference signal which simplifies calculation of the equaliser settings is a portion of modulated data such as is used in systems like GSM, for example. The reference signals are shown in FIG. 12. As shown in FIG. 12, the reference signals are separated in time with sufficient separation to allow for multipath delay. The beginning and end of the reference signals is characterised by a period of ramping so that the power does not change instantaneously.

To minimise overhead, the reference signals are used both for synchronisation, equaliser setting, and for weight vector selection. In addition, to further reduce overhead, the reference signals are designed and employed differently to those usually employed in TDMA systems (e.g. in TETRA and GSM). For weight vector selection with an equaliser setting, a codebook approach is employed.

Figure 8:
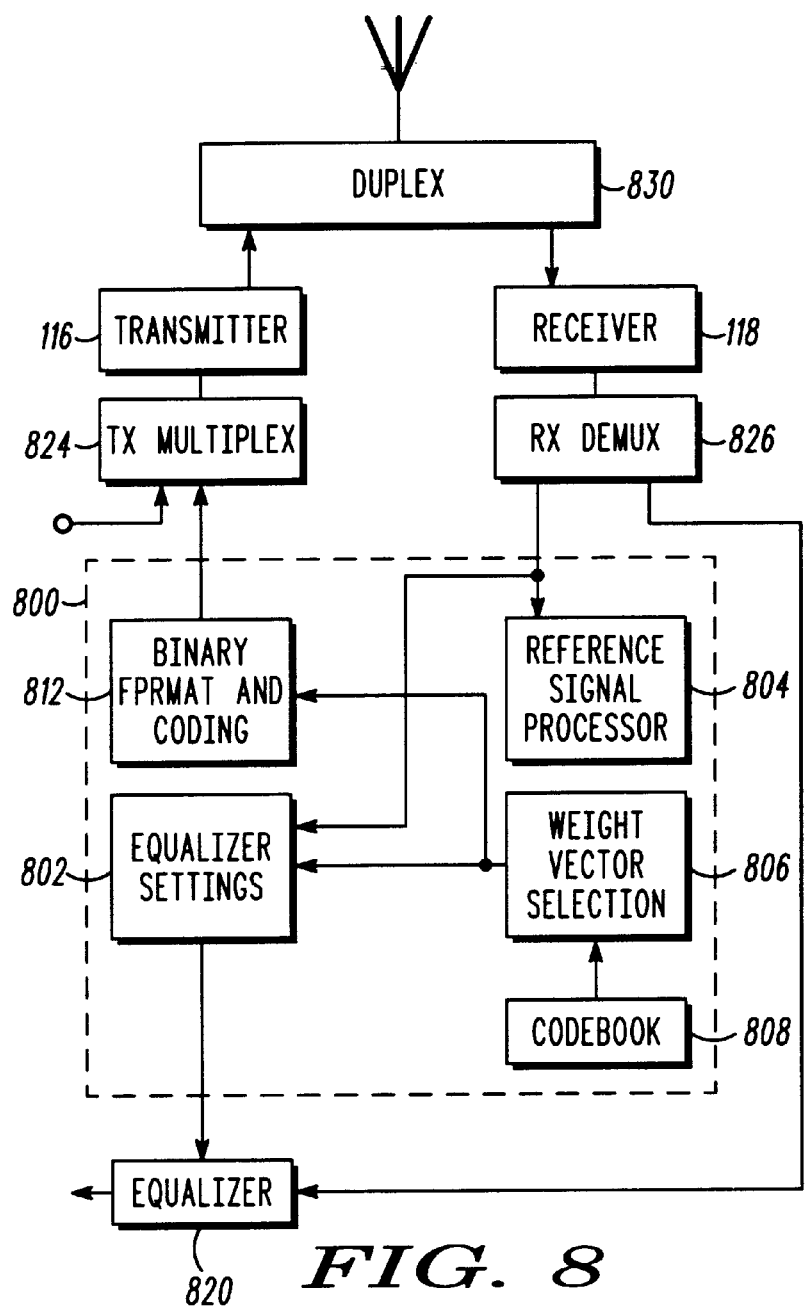
FIG. 8 is a circuit diagram illustrating a controller for use in a communication device having an equaliser in the receive path.

A controller circuit 800 including an equaliser setting circuit 802 is illustrated in FIG. 8. This controller can be used in communication device 702 or 704, or both, and is employed when one or both of the communication devices has an equaliser. The controller circuit 800 includes a reference signal processor circuit 804 which processes received signals to calculate the antenna weight at another communication device having an antenna array. A weight vector selection circuit 806 uses weight index stored in a codebook 808, which is the index of weights such as Table 1 or Table 2. The weight vector selection is input to the equaliser setting circuit 802 and a binary format and coding circuit 812. The binary format and coding circuit outputs information for transmission to the other communication device.

The transmitting communication device sends both information signals and reference signals as illustrated in FIG. 6. The reference signals are sent separately from each antenna. In order to minimise effects of delay in the feedback system, the reference signals are preferably noncontiguous with the information packets. Additionally, where the receiving communication device has an equaliser, and the equaliser and transmit path weights for an antenna array are set using the same reference signal, the signal for each antenna is preferably separated by time as opposed to being distinguished by frequency or code.

A method by which the weight vector is found independently of the equaliser setting, and then the receiver equaliser settings are determined from the weight vector, is first described. This method applies when the reference signals are chosen to minimise overhead, as is likely when communication device 101 is a base. The method uses values preset in the communication device. The matrix X is stored in the communication device at the time the communication device is manufactured, activated, or when it is being used in a new system. The matrix is calculated as follows:

$$X = (Y^H Y)^{-1} Y^H$$

where $$Y = \begin{pmatrix} \underline{r} & 0 & \cdots & 0 & 0 \\ 0 & \underline{r} & \cdots & 0 & 0 \\ 0 & 0 & \ddots & \vdots & \vdots \\ \vdots & \vdots & \cdots & \underline{r} & 0 \\ 0 & 0 & \cdots & 0 & \underline{r} \end{pmatrix},$$

and r is a column vector of the known reference signal waveform, and $Y^H$ is the Hermitian transform of Y.

The reference signal processor circuit 804 (FIG. 8) calculates and stores the correlation matrix R of the reference signals:

$$R = \Sigma_i s_i s_i^H$$

where $s_i$ is the reference signal received from the i'th antenna and $s_i^H$ is the Hermitian transform of the reference signal received from the i'th antenna.

The weight vector selection circuit 806 then performs calculations for each of the indexes in the codebook 808 to maximise the power signal p, where $$p = w^H . R . w$$

w represents a candidate weight vector, and $w^H$ represents a Hermitian transform of the candidate weight vector. The index of weights producing the largest value of p is thus selected. The index of the selected weight vector is then transmitted to the handset via the binary format and coding circuit 812.

The coefficients are then calculated from the selected weight vector. For example, in for a Maximum Likelihood Sequence Estimator (MLSE) equaliser, the equaliser coefficients are generated from settings derived in the equaliser setting circuit 802 as follows. First the vector v, which is an estimate of the signal that would be received if the reference signal is sent simultaneously from all antennas with the selected weights, is calculated as follows:

$$v = \Sigma_i s_i w_i^*$$

where $w_i$ is the i'th element of the selected weight vector. A channel estimate h, from which is extracted the equaliser settings, is calculated as follows:

$$h = (X\ v) \otimes m$$

where m is the modulation impulse response of a filter (not shown) in the transmitting communication device, and where $\otimes$ denotes convolution.

This vector h is used for symbol timing synchronisation after which the equaliser settings are extracted in a suitable manner as is known to those skilled in the art. Complexity is minimised by precomputing as many quantities as possible.

The equaliser settings for an information packet are found at the same time as the weight vector selection for the information packet. In some circumstances there may be significant delay in the feedback path. This affects both the accuracy of the weight vector selection and the equaliser setting. In an alternative method, the equaliser settings for one packet are found from reference signals which are used to derive weight vectors for the next information packet. This reduces delay in the establishment of the equaliser settings, and is possible where the weight selection and equaliser settings are independent.

The reference signals that minimise overhead are a portion of modulated data with properties such that the inverse $(Y^H Y)^{-1}$ shown above is well conditioned. As shown in FIG. 12 the reference signals will be separated in time with sufficient separation to allow for multipath delay. The beginning and end of the reference signals is characterised by a period of ramping so that the power does not change instantaneously, in the same way as in bursts of TDMA systems today.

According to another embodiment, the weight vector is found jointly with the equaliser settings. This method also applies when the reference signals are chosen to minimise overhead, that is likely when communication device 101 is a base. This approach is desirable when the equaliser length is such that the equaliser can not capture all multipath propagation. This approach employs a controller circuit 900 architecture depicted in FIG. 9. The controller circuit 900 can also be used with an MLSE equaliser. A weight vector selection and equaliser setting circuit 902 uses the quantities:

$$X=(Y^H Y)^{-1} Y^H$$

where $$Y = \begin{pmatrix} \underline{r} & 0 & \cdots & 0 & 0 \\ 0 & \underline{r} & \cdots & 0 & 0 \\ 0 & 0 & \ddots & \vdots & \vdots \\ \vdots & \vdots & \cdots & \underline{r} & 0 \\ 0 & 0 & \cdots & 0 & \underline{r} \end{pmatrix},$$

and r is a column vector of the known reference signal waveform.

These values are pre-computed and stored in the controller 752 as described briefly above. Another known impulse sequence is z, which is defined such that when z is filtered by a modulation filter (a filter, not shown, in the transmit path of communication device 702) having an impulse response m (such as a raised cosine filter), the resulting waveform is r. Before the codebook 808 values are used, the following quantities are computed and stored:

$c_i = (X \ s_i) \textcircled{x} \ m$, $R = \Sigma_i s_i . s_i^H$ where $s_i$ is the reference signal received from the i'th antenna.

index=1, min_error=1,000,00.0 p_threshold=a number between 0.0 and 1.0 such as 0.7.

where $c_i$ is a vector of coefficients representing components of the combined filter and channel responses from the i'th transmit antenna, m is the modulation impulse response of the transmit path filter (not shown), and $\textcircled{x}$ denotes convolution. The initial value for the minimum error is selected to be large. The p_threshold value is selected to limit the number of calculations that must be performed. Thus, only those weights having the highest power measurements are consider. The value 0.7 corresponds to having only the top 30% considered. The inventors have found that the fewest errors occur when the signal is strong, though not necessarily when it is the strongest. A larger, or smaller percentage, of the weight candidates can be considered.

The codebook calculations for J candidate weight vectors are then performed as follows:

do j=1 to J
  p=$w^H$.R.w where w is the candidate weight vector
  if p>p_threshold
    calculate "error"
    if error<min_error then
      min_error=error
      index=j
    end if
  end if
end do loop The equaliser setting circuit 902 first measures the power and determines if the power is above the threshold. For those power measurements above the threshold, the error is calculated using equaliser settings calculated for the weight vector. For an MLSE equaliser, the "error" is calculated at each iteration as follows:

candidate impulse response h=$\Sigma_i c_i w_i^*$

"error"=$|h'\textcircled{x}z-x|/|x|$ where x is a vector with components $x_i = w^H s_i$, |.| represents vector norm., h' represents the candidate equaliser settings which are extracted from h during the symbol timing synchronisation process, which synchronisation process as already described is known to those skilled in the art of equalisation, and $w_i^*$ is the complex conjugate of $w_i$. This process maximises the quality level by determining the values of h and w that minimise the errors, as opposed to detecting the weights that maximise the power of the received signal. The "error" is a quality estimate of a signal output by the equaliser.

The index of the selected weight vector is then processed for transmission to the handset by the binary format and coding circuit 812. The equaliser settings are used to set coefficients in the equaliser 820.

Figure 10:
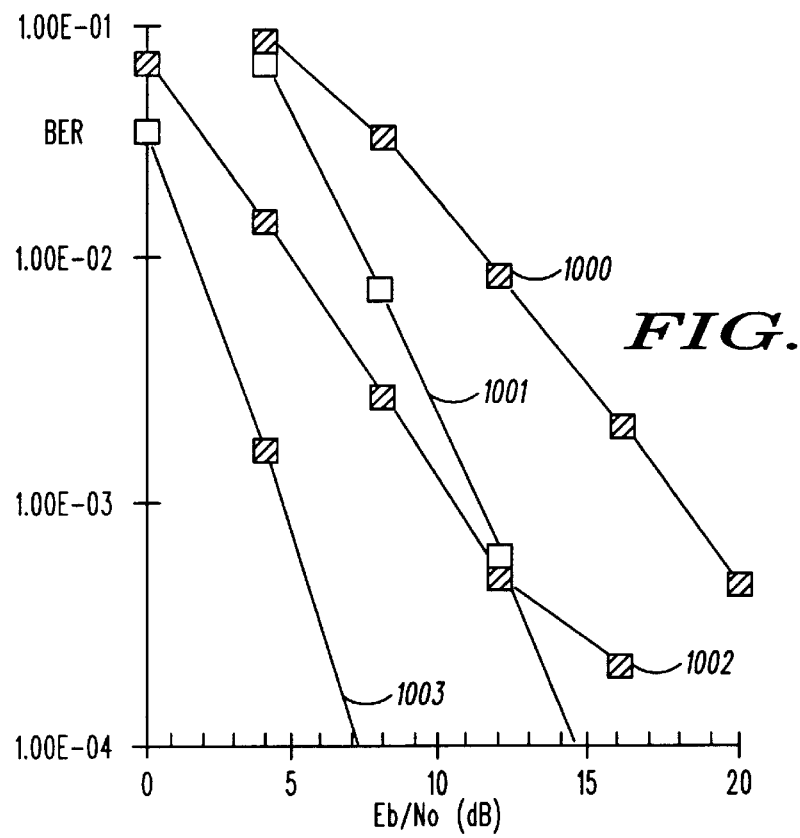
FIG. 10 illustrates the performance of the system of FIG. 8 with 4 transmit antennas compared to the case with no array for a GSM type system.

FIG. 10 shows the performance of the system of FIG. 8 with 4 transmit antennas compared to the case with no array for a GSM type system, with a 2 symbol delay spread channel and at pedestrian speeds. The graph shows Bit Error Rate (BER) versus the ratio of Energy per bit to noise power density (Eb/No) in decibels (dB). Curve 1000 is the performance with no error protection coding with no array, and should be compared to curve 1002 which is the corresponding uncoded performance with an array. Gains of the order of 7 dB are achieved which allows a very considerable increase in talk time or capacity within a mobile radio system. Curve 1001 is the performance with error protection coding with no array, and should be compared to curve 1003 which is the corresponding coded performance with an array. Gains of the order of 7 dB are again achieved. The overhead savings on both reference signals and weight specifiers are more than 20% over more conventional reference signal design and over weight vector quantisation, as opposed to codebook, schemes.

Figure 9:
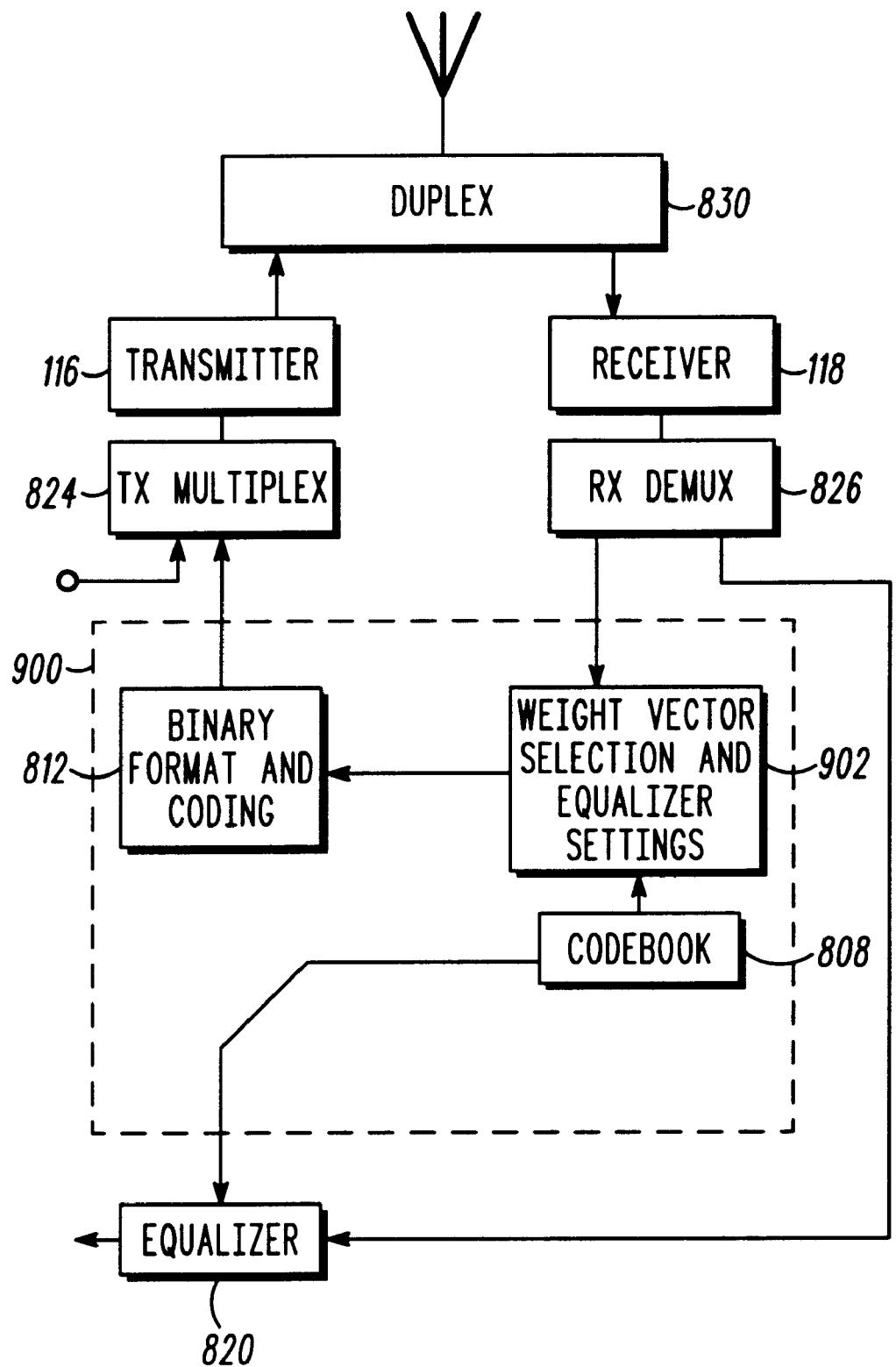
FIG. 9 is a circuit diagram illustrating an alternate controller for use in a communication device having an equaliser in the receive path.
Figure 11:
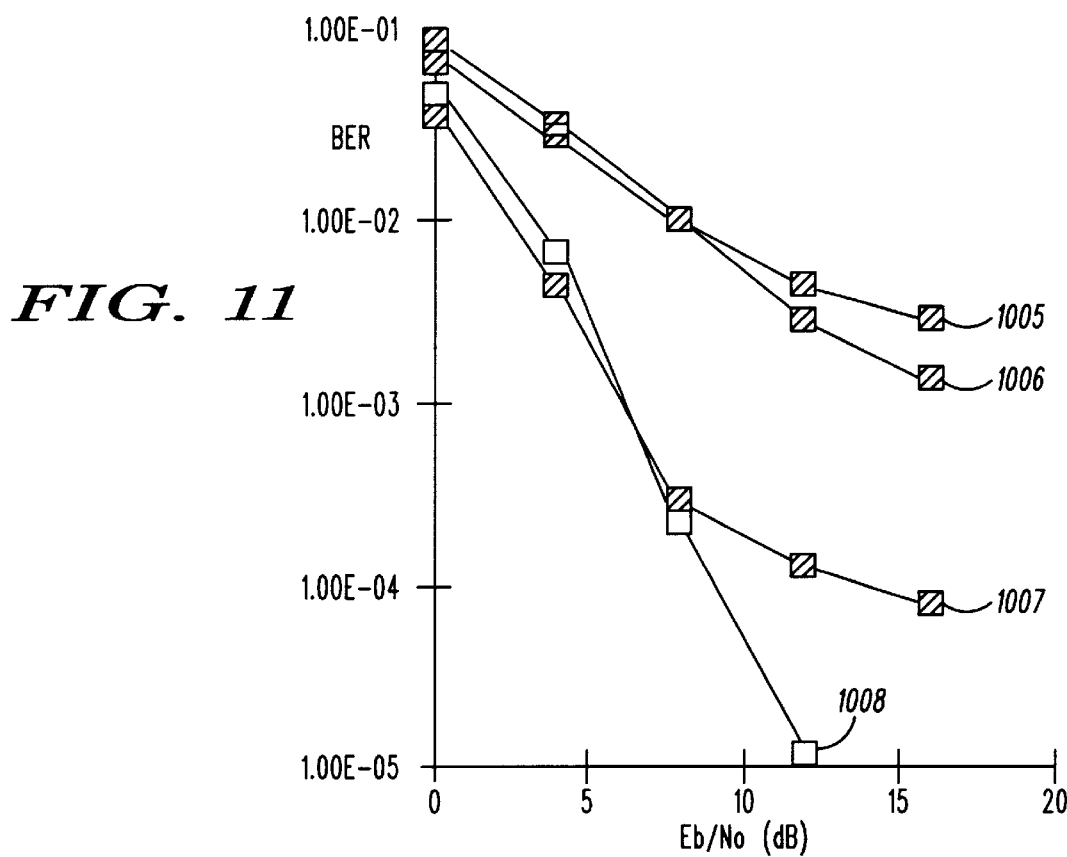
FIG. 11 illustrates the performance of the controller method of FIG. 9 compared to that of FIG. 8.

FIG. 11 shows the performance of the controller method of FIG. 9 compared to that of FIG. 8 in a particular case where it is not appropriate to estimate array settings and equaliser settings independently. Curve 1005 represents the performance with no error protection coding for the method of FIG. 8, which should be compared to the curve 1006 representing the uncoded performance for the method of FIG. 9. Curve 1007 represents the performance with error protection coding for the method of FIG. 8 which should be compared to the curve 1008 representing the coded performance for the method of FIG. 9. In this case, the circuit of FIG. 9 offers performance benefits in good signal conditions.

Thus it can be seen that the transmit path weights for an antenna array can be adjusted to improve the gain of the transmit path. The transmit path weights can be set independently of the receiving communication device. Alternatively, the receiving communication device can select the weights based upon a reference signal received from the transmitting communication device. A codebook can be employed to facilitate the process of selecting weights. Where the receiving communication device includes an equaliser, equaliser settings and weights can be calculated from the same reference signal thereby minimising transmission overhead.

What is claimed is:

1. A communication device comprising:

a receiver, the receiver receiving a reference signal transmitted through each of a plurality of antennas in a transmitting communication device, the receiver having a memory storing a codebook, the codebook containing codebook weights for a transmit path associated with the transmitting communication device;

circuitry for calculating at least one weight for a transmit path of the transmitting communication device from the reference signal received from each antenna;

a transmitter for transmitting the at least one weight to the transmitting communication device, the memory storing codebook weights of a previous transmit path, the circuitry using the codebook and the weights of the previous transmit path to calculate the at least one weight, the codebook being checked to see if it is the same as a codebook in the transmitting communication device, by transmitting the codebook from one of the receiving and transmitting communication devices to the other of the receiving and transmitting communication devices.

2. The communication device of claim 1, wherein the codebook weights are associated with codebook indexes, and the codebook indexes include error correction coding.

3. The communication device of claim 1, wherein the weights are selected to limit peak power in the transmit path.

4. The communication device of claim 1, wherein the circuitry calculates a weight and a phase value from a received reference signal and from a copy of a reference signal in the receiving communication device.

* * * * *